US012571905B2

(12) United States Patent
Partee et al.

(10) Patent No.: US 12,571,905 B2
(45) Date of Patent: Mar. 10, 2026

(54) COMBINATION OPTICAL AND MILLIMETER WAVELENGTH CAMERA

(71) Applicants: Charles Partee, Golden, CO (US); Bob Warren, Loveland, CO (US)

(72) Inventors: Charles Partee, Golden, CO (US); Bob Warren, Loveland, CO (US)

(73) Assignee: SYGHT, INC., Boulder, CO (US)

( * ) Notice: Subject to any disclaimer, the term of this patent is extended or adjusted under 35 U.S.C. 154(b) by 1079 days.

(21) Appl. No.: 17/063,502

(22) Filed: Oct. 5, 2020

(65) Prior Publication Data

US 2022/0107406 A1     Apr. 7, 2022

(51) Int. Cl.
| *G01S 13/88* | (2006.01) |
| *G01S 13/86* | (2006.01) |
| *G01V 8/00* | (2006.01) |

(52) U.S. Cl.
CPC .......... *G01S 13/867* (2013.01); *G01S 13/887* (2013.01); *G01V 8/005* (2013.01)

(58) Field of Classification Search
CPC ...... G01S 13/867; G01S 13/887; G01S 17/89; G01V 8/005
See application file for complete search history.

(56) References Cited

U.S. PATENT DOCUMENTS

| 4,313,069 A | 1/1982 | Szabo et al. |
| 4,661,809 A | 4/1987 | Anderson et al. |
| 6,262,574 B1 | 7/2001 | Cho et al. | |
| 10,345,631 B1 | 7/2019 | Partee et al. | |
| 2006/0085160 A1* | 4/2006 | Ouchi ..................... G01S 7/032 |
| | | | 702/150 |
| 2007/0235652 A1* | 10/2007 | Smith .................... G01V 5/271 |
| | | | 250/363.02 |
| 2007/0286460 A1* | 12/2007 | Tu ........................... G06V 20/52 |
| | | | 382/103 |
| 2008/0100510 A1* | 5/2008 | Bonthron ................ G01S 13/89 |
| | | | 342/373 |
| 2008/0129581 A1* | 6/2008 | Douglass ................ G01S 13/34 |
| | | | 342/52 |
| 2012/0026336 A1* | 2/2012 | Koren ................... G01S 13/887 |
| | | | 348/E7.091 |
| 2012/0182178 A1* | 7/2012 | Pesetski ................... H03D 7/02 |
| | | | 342/175 |

(Continued)

*Primary Examiner* — Timothy A Brainard
(74) *Attorney, Agent, or Firm* — Kenneth Altshuler

(57) ABSTRACT

The disclosed handheld camera device is a combination digital optical and millimeter wavelength (MMW) camera. In contrast to an optical camera, the MMW camera detects frequencies between 3-300 GHz making the MMW camera especially good at seeing metallic objects under garments, such as concealed weapons on a person or in a bag. The MMW camera can be arranged to point in the same field-of-view as the optical camera so that when an MMW image is taken it is automatically framed within the optical camera field-of-view. In certain configurations, the MMW camera takes a plurality of MMW images defined within an MMW field-of-view. In the case where the MMW field-of-view is smaller than the optical camera field-of-view, the multiple MMW images can be stitched together and overlaid on the optical image of the same scene to show a metallic object superimposed over a subject of interest.

20 Claims, 12 Drawing Sheets

(56)  References Cited

U.S. PATENT DOCUMENTS

| | | | |
|---|---|---|---|
| 2012/0288137 A1* | 11/2012 | Daly | G01V 8/005 |
| | | | 382/100 |
| 2013/0257646 A1* | 10/2013 | Gopalsami | G01K 11/006 |
| | | | 342/179 |
| 2020/0225321 A1* | 7/2020 | Kruglick | G01S 7/417 |
| 2020/0249341 A1* | 8/2020 | Valdes Garcia | G01C 11/02 |

* cited by examiner

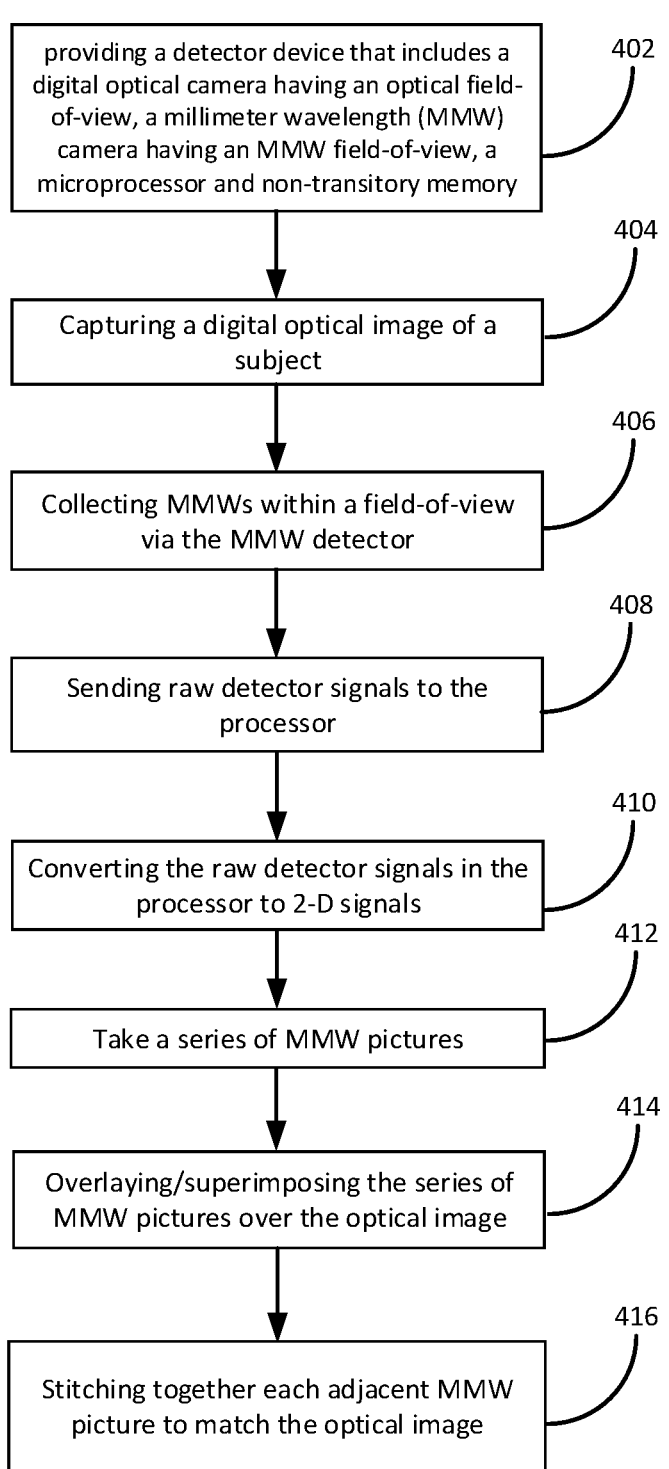

providing a detector device that includes a digital optical camera having an optical field-of-view, a millimeter wavelength (MMW) camera having an MMW field-of-view, a microprocessor and non-transitory memory — 402

Capturing a digital optical image of a subject — 404

Collecting MMWs within a field-of-view via the MMW detector — 406

Sending raw detector signals to the processor — 408

Converting the raw detector signals in the processor to 2-D signals — 410

Take a series of MMW pictures — 412

Overlaying/superimposing the series of MMW pictures over the optical image — 414

Stitching together each adjacent MMW picture to match the optical image — 416

FIG. 4

COMBINATION OPTICAL AND MILLIMETER WAVELENGTH CAMERA

CROSS-REFERENCE TO RELATED APPLICATIONS

None

FIELD OF THE INVENTION

The present embodiments are directed to a millimeter wavelength and wavelengths in the optical radiation range.

DESCRIPTION OF RELATED ART

Whether for protection or outright assault, people have been concealing weapons since before recorded history. Accordingly, personal examinations for security have existed just short of when concealed weapons were first conceived. With today's explosion of technology advances, the range of weapon options is expansive. From bombs and hand grenades to guns and knives, routine pat-downs can be a dangerous proposition for security personnel. Taking into account modern-day social sensitivities, the intimate touch of a pat-down is not looked upon favorably. Armed with this understanding, it should be obvious that innovations around pat-downs, such as metal detectors and x-ray systems, are being actively used to help reveal and thwart unwanted entrance of concealed weapons in secure locations without invasion of personal space. In fact, use of metal detectors and x-ray systems are ubiquitous in airports, government buildings, hospitals, etc. Though reasonably effective, these detectors need to be within a couple of feet from the subject being scanned for any hope of obtaining a signal strong enough to adequately detect a concealed weapon. In the case of x-rays, undesirable health impact has been shown. Most metal detectors and x-ray systems are large stationary pieces of equipment that a person must walk to or through.

Hand-held metal detectors (often shaped like wands with the sensor at one end and the handle at the other) in particular require close proximity to the subject of interest in order to detect items of interest. Further, only one person at a time can be scanned with these devices. One of the most utilized hand-held detector that can detect metal is a wand that operates 6 inches from the person and is marketed as a long-distance metal detector.

It is to innovations related to this subject matter that the claimed invention is generally directed.

SUMMARY OF THE INVENTION

The present embodiments are directed to hand-held millimeter wavelength and digital cameras, which include optical, IR, LIDAR, nightvision, etc, which can generate digital images.

Certain embodiments of the present invention contemplate a combination camera detector device comprising: a digital optical camera possessing an optical camera field-of-view; a millimeter wavelength (MMW) camera possessing an MMW camera field-of-view that is less than or equal to the optical camera field-of-view, the MMW camera pointing in a direction that is within the optical camera field-of-view; a computer system with a microprocessor and non-transitory memory operable with a display; and an overlay MMW and optical image verification algorithm configured to overlay a plurality of MMW images obtained from the MMW camera with an optical image obtained from the digital optical camera, the verification algorithm retained in the non-transitory memory and detection executed by the microprocessor.

Yet other certain embodiments of the present invention envision a method for capturing a detector image and optical image, the method comprising: providing a detector device that includes a digital optical camera having an optical field-of-view defining an optical image perimeter, a millimeter wavelength (MMW) camera having an MMW field-of-view, a microprocessor and non-transitory memory; capturing a digital optical image of a subject with the digital optical camera; storing the digital optical image in the non-transitory memory; taking a plurality of MMW images of a plurality of different portions of the subject; and overlaying the plurality of MMW images over the digital optical image within the optical image perimeter until at least a portion of interest of the digital optical image is essentially completely overlaid with a contiguous assembly of the MMW images.

While other certain embodiments of the present invention imagine a detector comprising: a digital optical camera having a line of sight and an optical camera field-of-view; a millimeter wavelength (MMW) camera including at least one MMW emitting antenna, at least one MMW collecting horn and at least a one pixel MMW sensor, the MMW camera essentially pointing in the line of sight, the MMW camera having an MMW camera field-of-view, the MMW camera field-of-view is smaller than the optical camera field-of-view; a computer system with a microprocessor and non-transitory memory operable with a display; an overlay MMW and optical image verification algorithm that overlays a plurality of MMW images obtained from the MMW camera with an optical image obtained from the digital optical camera, the verification algorithm retained in the non-transitory memory and executed by the microprocessor.

BRIEF DESCRIPTION OF THE DRAWINGS

FIG. 4 is a block diagram of a method embodiment of the present invention; and

DETAILED DESCRIPTION

Figure 1A:
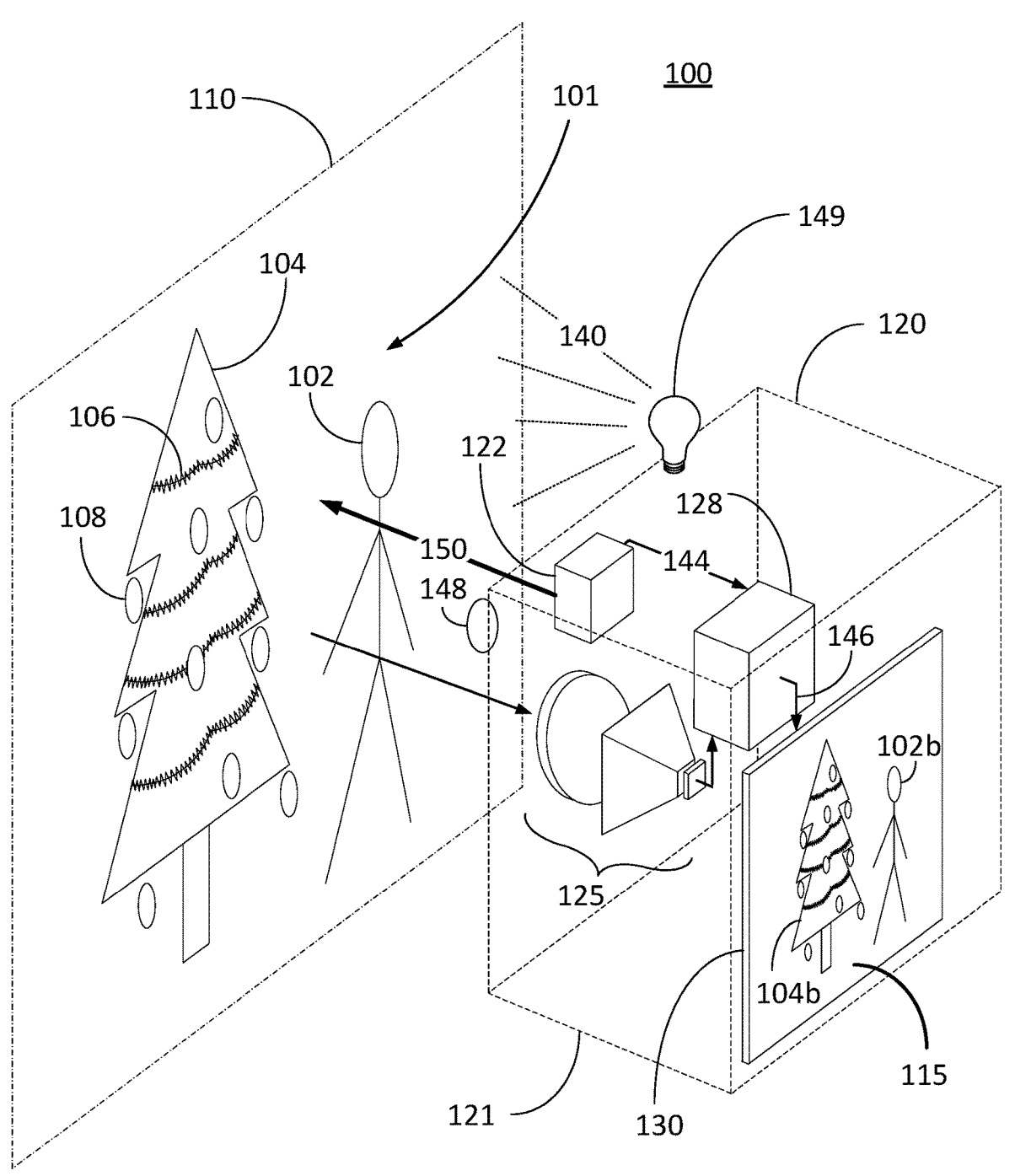
FIG. 1A is a line drawing of a scene being viewed by an MMW and optical camera system, or simply "camera device", consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other types of situations involving similar uses of a dual optical and millimeter wave (MMW) camera. In what follows, similar or identical structures may (and may not) be identified using identical callouts.

Described herein are embodiments of a camera device that can be a combination of one or more digital optical and millimeter wavelength (MMW) cameras. In certain embodiments the camera device can be a handheld. The digital optical camera is configured to take digital images of a particular scene in the optical camera field-of-view and transfer the digital images to non-transitory memory in the camera device. Certain embodiments envision the digital optical camera being able to take images in an optical radiation range defined as including ultraviolet (UV), light, and infrared (IR). Hence, the optical radiation range as used herein essentially ranges from 100 nm to 1 mm, or spanning the lower limits of UV to the upper limits of IR. Certain embodiments of the present invention envision substituting the digital optical camera for cameras using different detecting techniques, such as LIDAR, nightvision, etc., which can all generate digital images without departing from the scope and spirit of the present invention. It should also be appreciated that the use of an optical camera that strictly takes images within the light spectrum, or some variant thereof, is likewise considered an optical camera within the scope of the present invention. In contrast to a digital optical camera, the MMW camera detects frequencies between 3-300 GHz making the MMW camera especially good at seeing metallic objects under garments, such as concealed weapons on a person or in a bag. The MMW camera can be arranged to point in the same field-of-view as the optical camera so that when an MMW image is taken it is automatically framed within the optical camera field-of-view. In certain configurations, the MMW camera takes a plurality of MMW images defined within an MMW field-of-view. In the case where the MMW field-of-view is smaller than the optical camera field-of-view, the multiple MMW images can be stitched together and overlaid on the optical image of the same scene to show a metallic object superimposed over a subject of interest, such as a person potentially carrying a concealed weapon or a weapon in a bag. In the event the MMW images taken extend beyond the optical camera field-of-view, certain embodiments envision the optical camera continuing to take optical images in the MMW field-of-view, that are then stitched together, to accommodate all of the MMW images. In this way, an end-user can easily evaluate the threat of a concealed weapon outside of a single optical field-of-view perimeter.

FIG. 1A is a line drawing of a scene being viewed by an MMW and optical camera system, or simply "camera device", consistent with embodiments of the present invention. As depicted, the camera device 120 is pointing towards a scene 101 of a person 102 and Christmas tree 104 decorated with shiny metallic Christmas balls 108 and garland 106. The scene could just as easily include a bag, such as a duffel bag, as the subject matter containing or suspect of containing a concealed weapon with or without a human being present. The camera device embodiment 120 includes a digital optical camera 122 (that can operate in the optical radiation range) having a line of sight 150 pointed towards the scene 101. The digital optical camera 122 has an optical camera field-of-view 110 defined by the dashed-dotted rectangular line surrounding the scene 101. Field-of-view used herein means the picture size that the camera 122 is capable of taking in a single frame (i.e., not in a video). The digital optical camera 122 can take a picture, the data is transferred via an optical camera-to-computer connection 144 that is processed by computing system 128 and displayed on a display screen 130. In the present diagram 100, the processed image is transferred from the computing system 128 to the display 130 via a computer-to-display connection 146. Certain embodiments envision the digital optical camera 122 including an optical lens (not shown) that focuses light onto an image pickup device, such as a CMOS chip or other digital camera device known to those skilled in the art. As shown, the displayed optical image 115 of the person 102b and the Christmas tree 104b is displayed on the display screen 130. Certain commercial embodiments envision the display screen 130 being an LCD (liquid crystal display) display screen, however a multitude of different kinds of screens can be equally used without departing from the scope and spirit of the present invention. A light source 149 can further be integrated with the camera device 122 to illuminate 140 the scene 101 if the scene 101 is insufficiently lit. Certain embodiments envision the light source 149 being in the visible range while other embodiments envision light source emitting light in the optical radiation range (between the broadest limits of infrared and ultraviolet) with the camera device 122 capable of detecting images in the chosen spectrums. The camera device 120 further includes an MMW camera 125 that is also connected to the computing system 128. The MMW camera 125 can be essentially pointing in optical camera line of sight 150. Pointing in the optical camera line of sight 150 is envisioned herein to include being parallel to the optical camera line of sight 150 within the optical camera field-of-view 110, not being parallel to the optical camera line of sight 150 but pointing within the optical camera field-of-view 110, and pointing to the center of the optical camera field-of-view 110. As shown, the MMW camera 125, the optical camera 122 and computing system 128 are essentially enclosed in a camera housing 121, whereby lenses, lights, apertures, display screen 115 and other elements may partially protrude or extend from the camera housing 121.

Figure 1B:
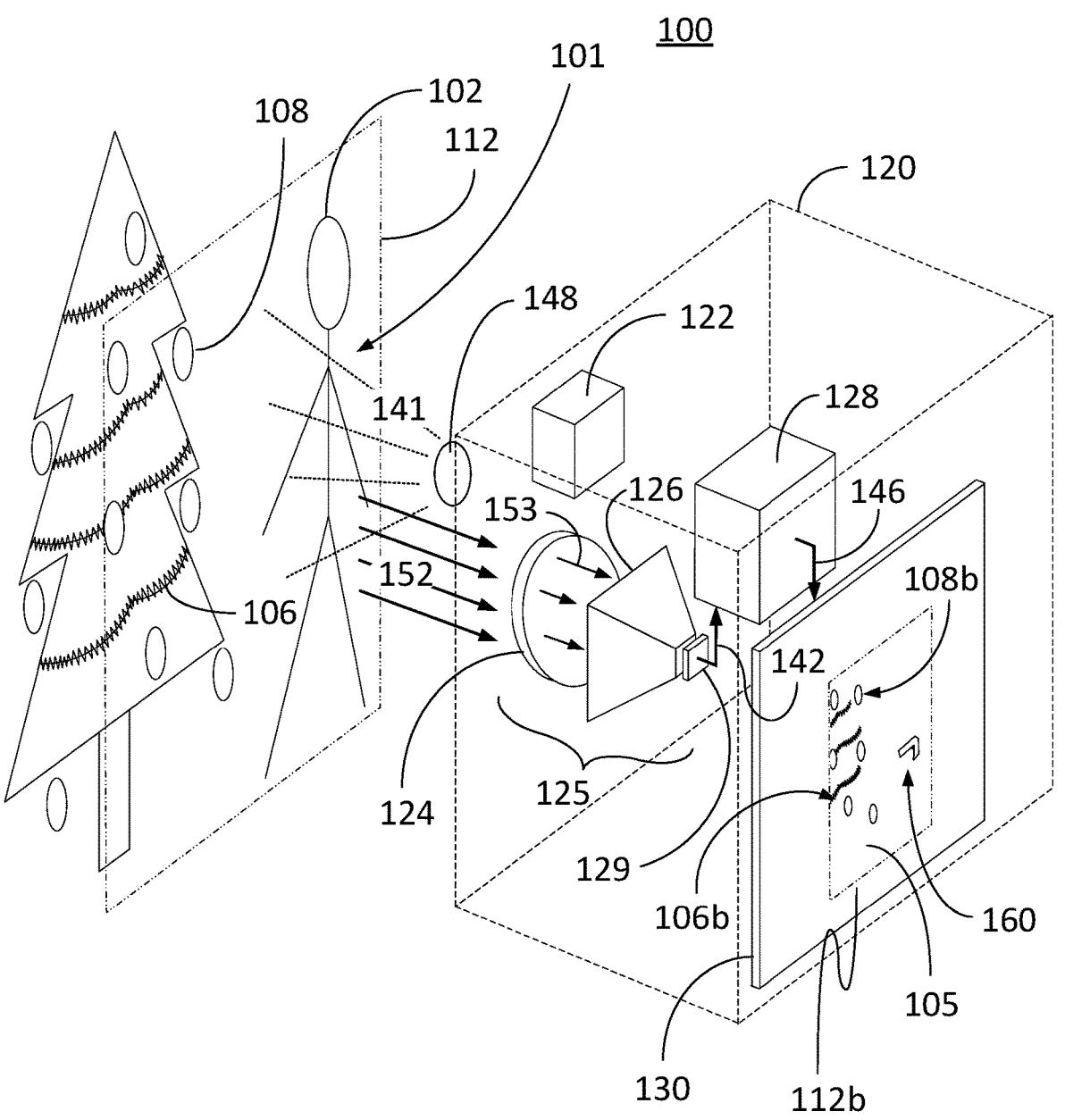
FIG. 1B is a line drawing of the scene being viewed by the MMW camera consistent with embodiments of the present invention.

FIG. 1B is a line drawing of the scene 101 being viewed by the MMW camera 125 consistent with embodiments of the present invention. The MMW camera 125 is adept at imaging metallic objects and in the situation where the person 102 is being screened for a concealed weapon, or other metallic object, an MMW image, or multiple MMW images, is taken of the person 102. A portion of the Christmas tree 104 is included within the MMW perimeter of interest 112 due to the Christmas tree's proximity to the person 102. The perimeter of interest 112 is depicted by a double dotted dashed line. Certain embodiments contemplate the MMW field-of-view being defined within the MMW perimeter of interest 112 while other embodiments envision the MMW field-of-view being smaller than the MMW perimeter of interest 112. MMW field-of-view as used herein means the MMW image size 204 (see FIG. 3A) that the MMW camera 125 (such as the raw data transferred from the detector 129) is capable of taking in a single frame. In the present embodiment, the MMW perimeter of interest 112 is smaller than the optical field-of-view 110. Other embodiments envision the MMW perimeter of interest 112 being equal to or smaller than the optical field-of-view 110. Yet in other embodiments, the optical field-of-view can be adjustable (such as before hand or on-the-fly) to obtain a higher resolution or a higher frame rate, for example.

The fundamental layout of the MMW camera system 125 in this embodiment generally includes an antenna 124, an electromagnetic horn 126 and the MMW detector 129. In certain embodiments, different configurations can accomplish the goal of collecting MMW waves, e.g., the horn 126 can function as the antenna 124, etc. The MMW camera system 125 detects electromagnetic waves (EMW) in the millimeter (mm) frequency range from between 3 GHz to 300 GHz. Based on principles of blackbody radiation, all objects above absolute zero radiate millimeter waves (MMWs) essentially uniformly in all directions. Objects also reflect ambient MMW in the environment (from sources such as the sun, MMW sources 148 and the like, or interior lighting, or other objects emitting MMW due to blackbody radiation. Since the wavelength of MMWs is long enough to penetrate clothing (compared to visible light, for instance) yet is short enough to resolve small metal objects that reflect or emit MMW, they are particularly well-suited for identifying concealed metal weapons.

As further shown in FIG. 1B, the MMW camera 125 collects MMWs 152 (or more specifically the MMW electromagnetic energy) emitted from a particular field-of-view 102 of the scene 112 thereby directing the collected MMW energy 153 to the MMW detector 129 via the electromagnetic horn 126. As previously mentioned, a number of different antenna configurations are envisioned within the scope and spirit of the present invention including a Cassegrain antenna, which includes a parabolic antenna having a feed antenna mounted behind an aperture formed in the center of the surface of a concave main parabolic reflector dish. The feed antenna is in front of the main dish to direct radiation reflected from the dish back through the spatial light modulator and ultimately to the MMW detector 129 via the electromagnetic horn 126. The electromagnetic horn 126, which can made from a suitable electrically conductive material, effectively funnels the collected MMW energy 153 to the MMW detector 129. The MMW detector 129 can be a single pixel detector or multi-pixel detector that converts the detected MMW energy 153 to an output voltage signal. Certain commercial embodiments of an MMW detector are produced by Millitech, Ommic, Faran Technology, QuinStar Technology, Inc., or Hughes Research Laboratories, LLC., for example.

The MMW detector output voltage signal of the scene 101 is electrically transmitted from the MMW detector 129 to the computing system 128 via pathway 142, which can be an electrical wire line for example. The computing system 128 conditions the MMW detector output voltage signal into a metallic enhanced MMW digital image 105 (whereby metallic objects are enhanced) that is sent over pathway 146 to be displayed on the display screen 130. Pathway 146 can be a wireline connection between the computing system 128 and the display device 130, for example. The metallic enhanced MMW digital image 105 is within the displayed MMW perimeter of interest 112b shown by the double dotted dashed perimeter lines. The MMW digital image 105 essentially shows metallic images (i.e., images of metallic objects), which herein is a concealed gun shaped object 160 in addition to images of the metallic Christmas balls 108b and the metallic garland 106b within the MMW perimeter of interest 112b. Though certain embodiments envision the MMW camera 125 collecting MMW's passively from ambient radiation reflected and emitted from the subject of interest, other embodiments envision an active MMW radiation source 148 emitting MMW radiation 141 that actively reflect MMW's from the subject of interest. Certain embodiments envision the MMW radiation source 148 emitting a wavelength of between 3-300 GHz with some embodiments envision the MMW radiation source 148 emitting a wavelength centered at 94 GHz.

Figure 1C:
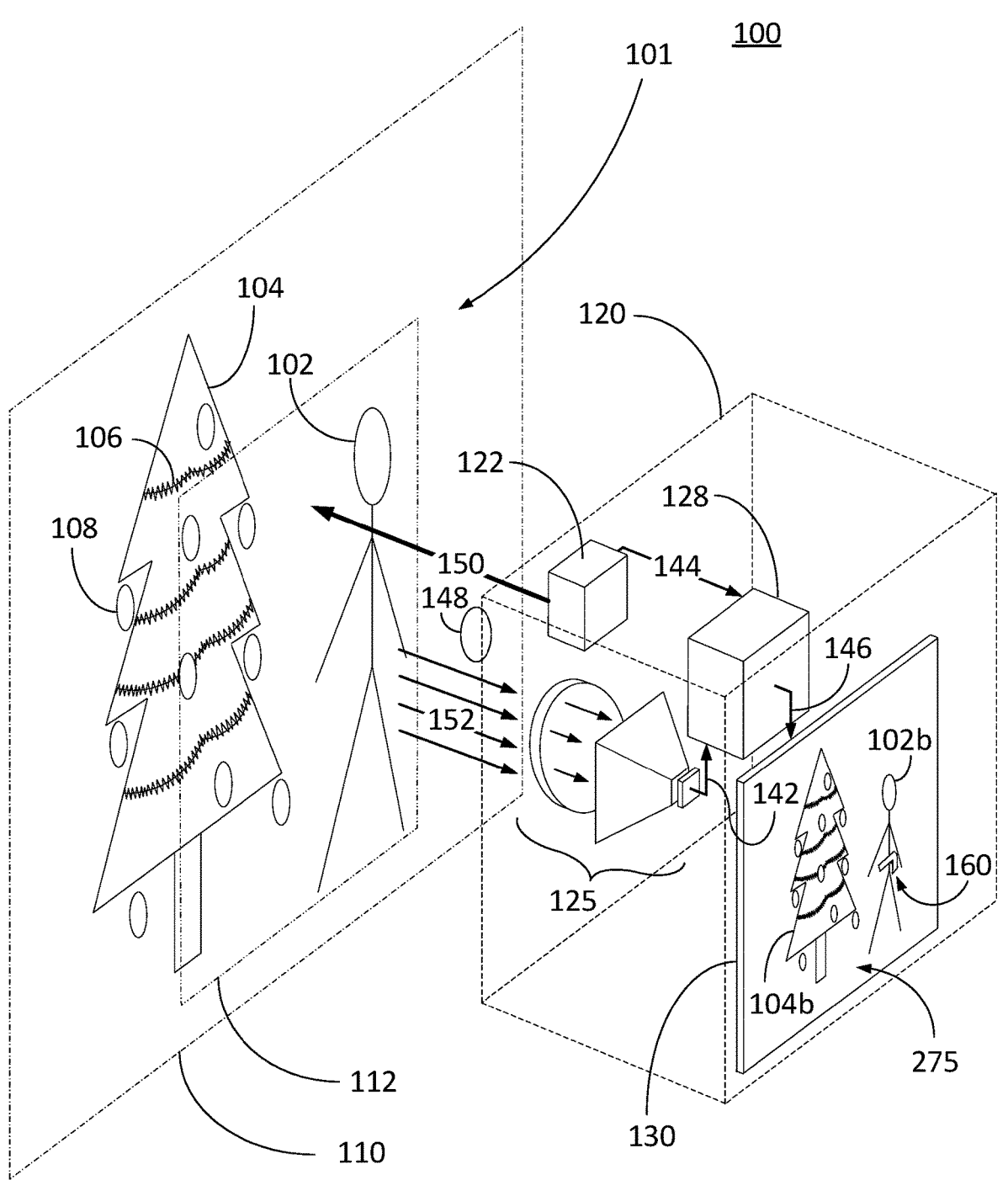
FIG. 1C is a line drawing illustratively showing the MMW image superimposed over the optical image as a joint overlaid displayed MMW and optical image.

FIG. 1C is a line drawing illustratively showing the MMW image 105 superimposed over the optical image 115 as a joint overlaid displayed MMW and optical image 275. Certain embodiments envision the optical image 115 of the scene 101 providing reference to the metallic objects 160, 106b and 108b from the MMW digital image 105. Here, the display screen 130 depicts the superimposed optical image 105 showing the person 102b (or other living subject) and the Christmas tree 104b along with the gun shaped object 160 that is obscured or otherwise unidentifiable in the optical image 105. Some embodiments envision a software algorithm retained and executed in the computing system 128 that matches the gun shaped object 160 to a best fit gun type based on digital recognition. Other embodiments simply identify that there is a metallic object and warn an end-user such as via light/s, sound, vibration, etc., of the metallic object. Some embodiments imagine an alarm only sounding if a metal object is above a certain size so that people do not get harassed for wearing a wedding ring or eye glasses, for example.

Figure 2:
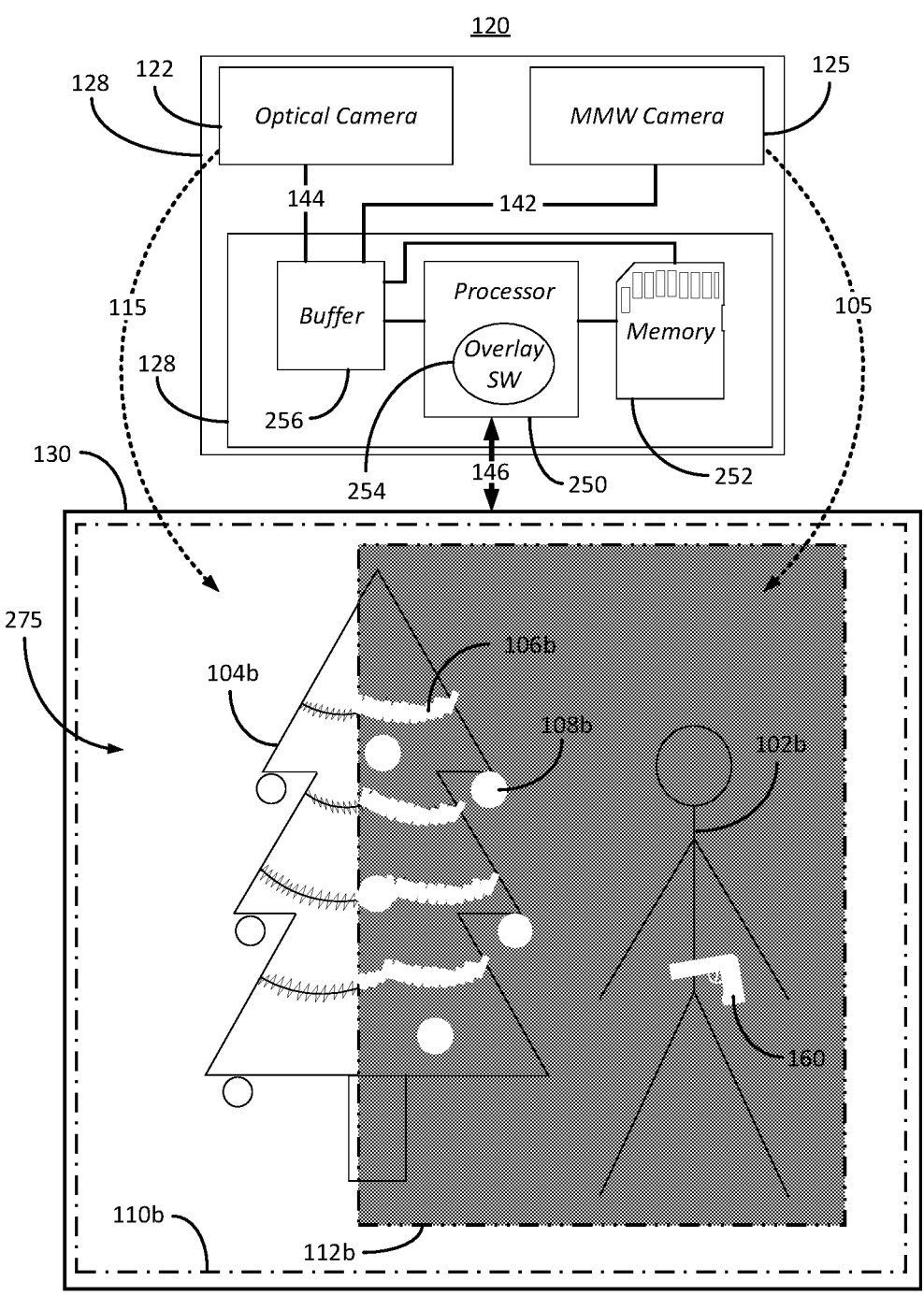
FIG. 2 illustratively shows a block diagram of representative elements in the camera device consistent with embodiments of the present invention.

FIG. 2 illustratively shows a block diagram of representative elements in the camera device 120 consistent with embodiments of the present invention. As previously discussed, the camera device 120 generally comprises an optical camera 122 capturing an optical image 115 of a scene 101 in addition to an MMW camera 125 capturing an MMW image 105 of a portion of the scene 101. Both images 105 and 115 are displayed on the display screen 130. In this figure, the displayed optical image field-of-view 110b is overlaid with the displayed MMW perimeter of interest 112b. The gray rectangular displayed MMW image 105 depicts the illuminated representation (in white) of the metallic gun shaped object 160, the metallic garland 106b and the metallic Christmas ball 108b. The black lines represent the displayed optical image 115 of the Christmas tree 104b, the non-MMW garland portions 106b, non-MMW Christmas balls 108b and the person 102b.

In the present configuration, the optical camera 122 captures an image of the scene 101 with or without assisted illumination 140 and sends the optical image data to a buffer storage 256 residing in the computing system 128. The buffered optical image data can be sent to nonvolatile memory 252, which in certain embodiments is a solid-state non-transitory flash memory card, in addition to a processor 250 where the optical image data is formatted (the an optical formatting algorithm operated by the processor 250) as a displayable optical image that is sent 146 to the display device 130. As shown by the connections between the buffer 256, the memory device 252, and the processor 250, the buffered optical image can be stored to the memory device 252 and/or be sent directly to the processor 254 for formatting whereby the formatted optical image 115 can then be sent to and the memory device 252 where the formatted optical image 115 can be retained, for example.

Similarly, the MMW camera 125 captures at least one MMW image of at least a portion of the scene 101 with or without assisted MMW illumination 141 and sense the MMW image data to the buffer storage 256. The buffered MMW image data can be sent directly to the memory device 252 that is in communication with the processor 250 or from the buffer 256 to the processor 250. The processor 250 is arranged and configured to execute software algorithms 254 that not only convert the MMW image data as a displayable MMW image but can overlay the MMW image data over the optical image (or optionally optical image data). Moreover, the processor 250 can operatively execute other software programs, such as those that stitch together in either or both x and y directions, a plurality of MMW field-of-view images 204 (of FIG. 3A) into an overall MMW image of the portion of interest 112b of the scene 101. At least one of the stitched together MMW image 105 of the portion of interest 112b, the MMW field-of-view images 204, and the raw data received from the MMW camera 125 can be retained in the memory device 252. At least one of the stitched together MMW image 105 of the portion of interest 112b and an MMW field-of-view image 204 is displayed on the display screen 130 either overlaid on the optical image 115 or displayed independently. These images can originate from the memory device as well. As illustratively depicted, the display screen 130 is displaying the overlaid displayed MMW and optical image 275.

Figure 3A:
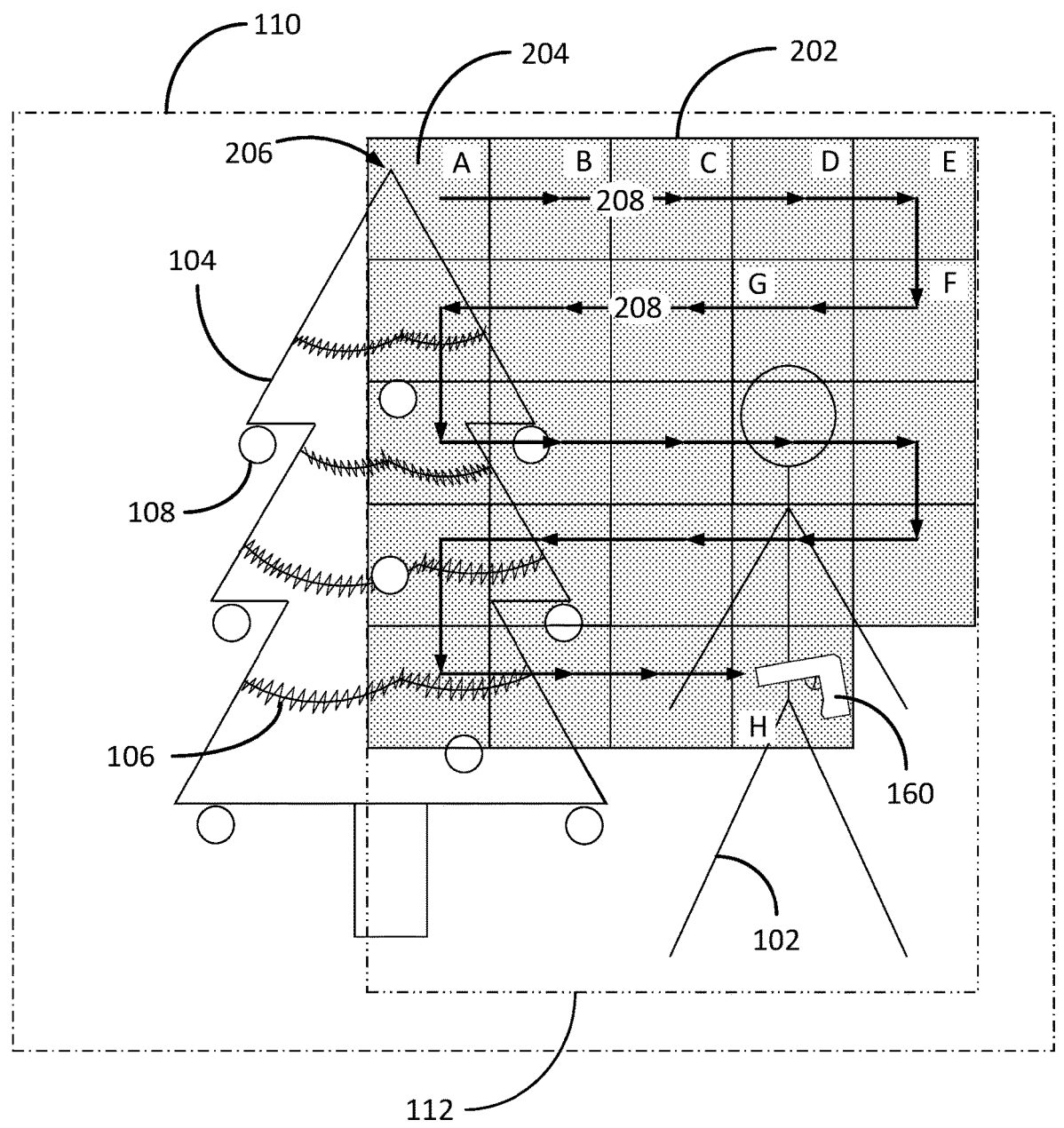
FIGS. 3A-3E show MMW images stitched together and overlaid on an optical image of a scene via a stitching algorithm consistent with embodiments of the present invention.

FIGS. 3A-3E show MMW images stitched together and overlaid on an optical image of a scene via a stitching algorithm consistent with embodiments of the present invention. FIGS. 3A-3E are described in view of the method block diagram of FIG. 4. FIG. 3A illustratively depicts a plurality of field-of-view MMW images 204 that are stitched together to form a contiguous MMW image 105 that is overlaying an optical image 115. This example contemplates that after taking an optical picture and displaying the optical picture as an optical image 115 on the display screen 130, the MMW camera 125 is then enabled to take images, step 404. As shown, the MMW camera 125 essentially only collects MMWs 152 within an MMW field-of-view 202, which in this example is smaller than the optical camera field-of-view 110. The MMW field-of-view image 204 is essentially bound within the square MMW field-of-view perimeter 202. Hence, the MMW field-of-view image 204 is the end result of MMWs 152 acquired by the MMW detector 129 within the MMW field-of-view 202, step 406. The MMW detector converts the acquired MMWs 152 into raw output millivolt signals that are then sent to the processor 250, step 408. The processor 250 converts the raw output millivolt signals into the two-dimensional MMW field-of-view images 204, step 410.

Figure 3B:
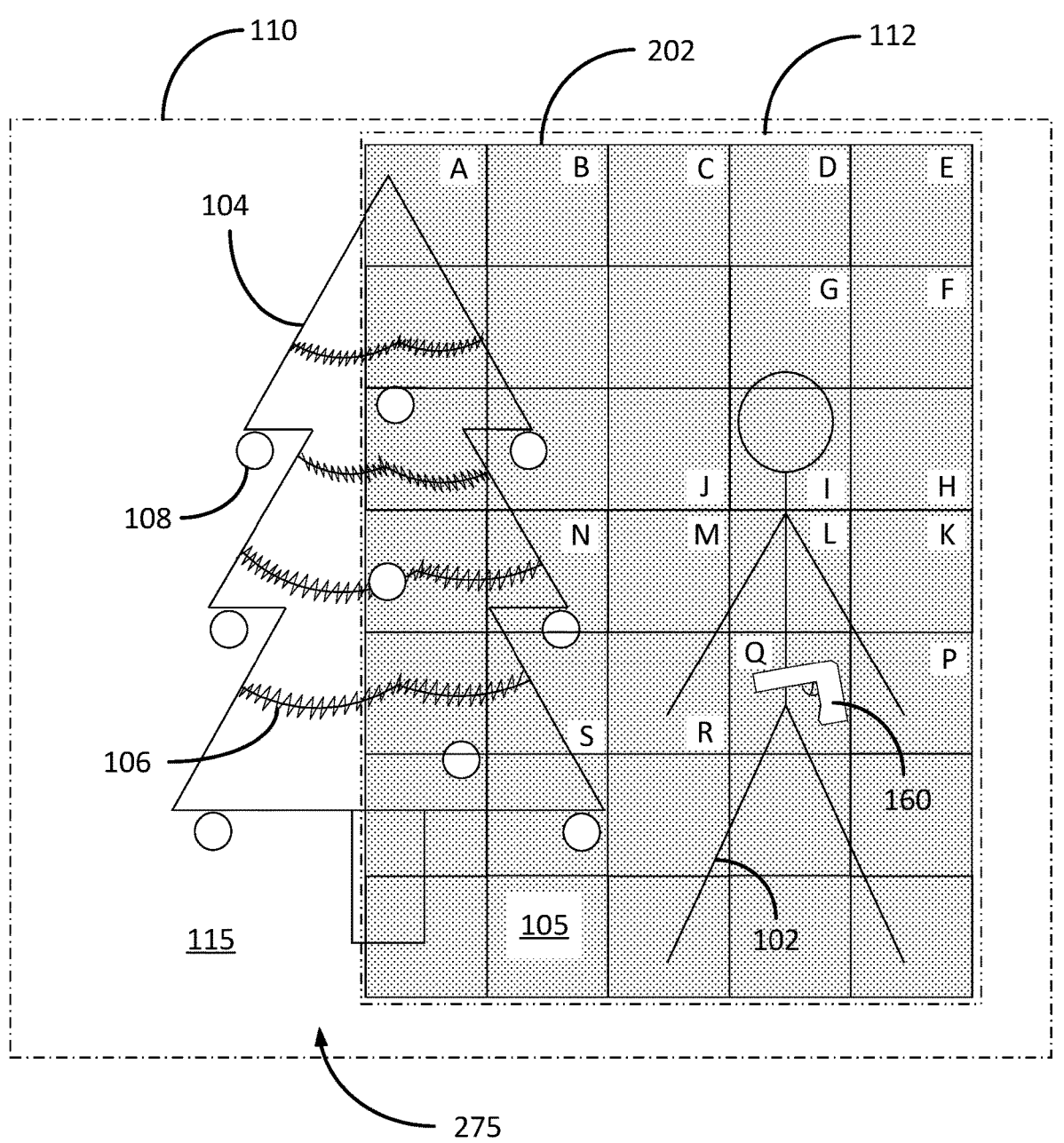

With continued reference to FIG. 3A, a first MMW image (image-A), captured by the MMW camera 125, is of the Christmas tree apex 206 in the upper left corner of the MMW images 204. Following the arrowed path 208, a second MMW image (image-B) is taken, then image-C and so on, step 412. In this embodiment, the MMW pictures are taken sequentially along the arrowed path 208, which can be accomplished by a motorized antenna 124 (such as by a motor traversing the antenna 124 about a gimbal, for example) that collects MMWs 152 in the arrowed pathway 208 as shown. Other embodiments envision the camera system 120 being mechanically moved along the pathway 208. In the present embodiment, each MMW field-of-view image 204 (i.e., image-A, image-B, image-C, etc.) appears overlaid on the optical image 115 as the MMW field-of-view images 204 are acquired up to image-H in this example, step 414. An overlay software algorithm 254 stitches together each adjacent MMW field-of-view image 204 to generate the overall contiguous MMW image 105. This stitching is done by detecting the x and z directions of the movement, either due to calculation of the movement of the gimbal, but can also be via an accelerometer (such as a 3-D accelerometer) that is sensing the magnitude and direction of the movements at all time and therefore the special relationship between the optical image 115 and the MMW images 204. The overlay software algorithm 254 can be retained in the memory device 252 and executed on the processor 250, step 416. As shown in FIG. 3B, the end result is the overall contiguous MMW image 105 superimposed over the optical image 115 (the overlaid displayed MMW and optical image 275), which shows the person 102 in possession of a gun shaped metallic object 160. Certain embodiments envision that the digital optical camera 122 and the MMW camera 125 capturing images of the same scale, while other embodiments envision the processor 146 adjusting the scale of the optical image and the MMW image 105 (or the MMW field-of-view images 204) to be the same scale in order to align the two images 105 and 115 when overlaid. Although FIG. 3A shows no overlap between consecutive MMW images, such as 204B and 204C, overlapping the images is also feasible. The consistent path 208 shown in this figure is easily accomplished with a stationary device and a mechanized scanning method. The method shown would be consistent with a stationary mounted raster-scanning gimbal, for example. Other methods, such as a stationary mounted helical scan, are also possible. In existing devices that use a consistent path of some type, the position of the MMW field of view images is generally known relative to the position of the optical image due to the mechanized scan and stationary device. That information is used in the overlaying of the visible and the MMW image.

Figure 3C:
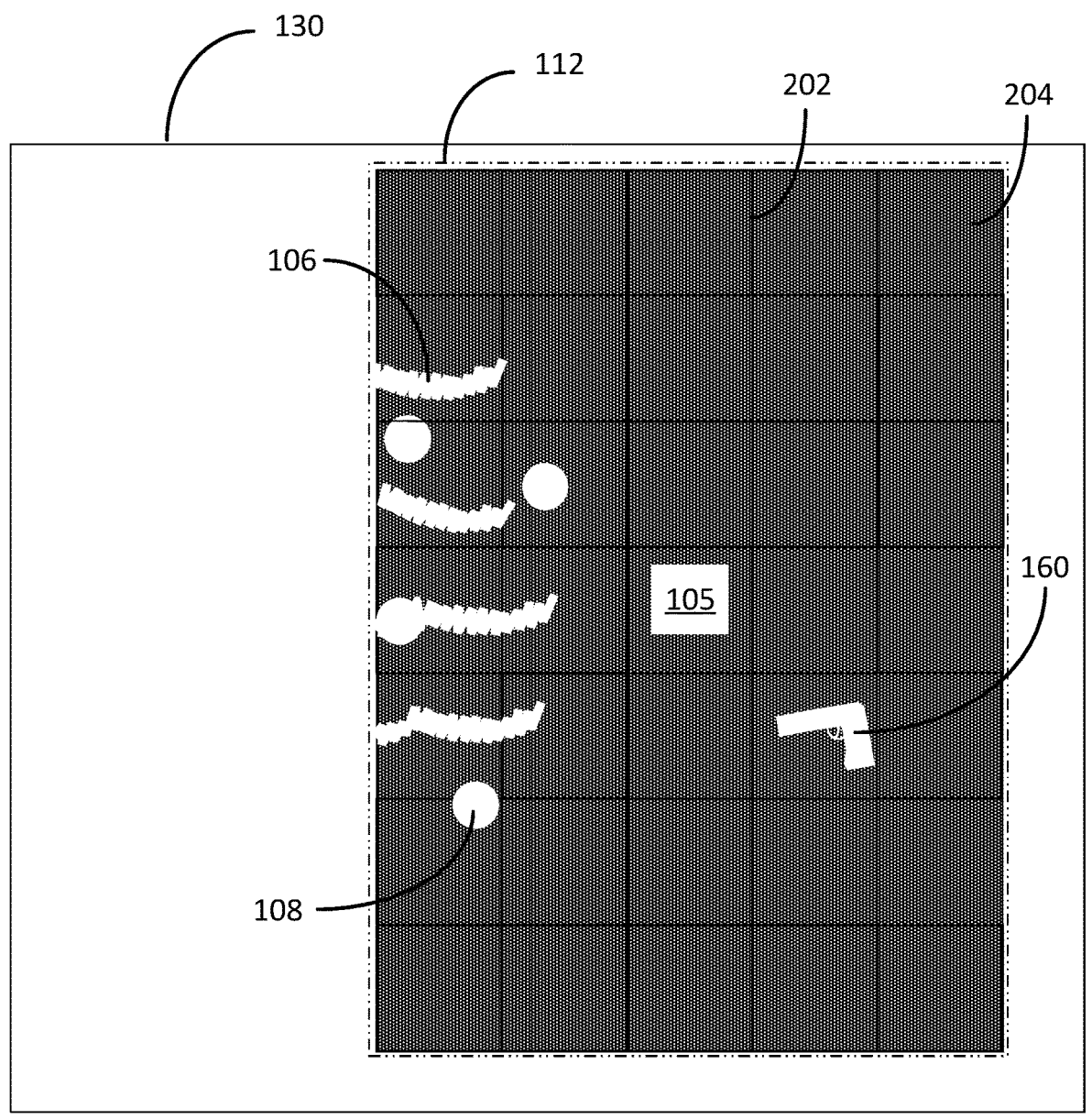

FIG. 3C illustratively depicts the overall contiguous MMW image 105 without the optical image 115 consistent with embodiments of the present invention. As shown, the metallic gun looking object 160, the metallic garland 106 and the metallic balls 108 are enhanced white against a dark background. Certain embodiments envision the display 130 capable of showing only the overall MMW image 105, which in this embodiment is made up of the plurality of MMW field-of-view images 204 illustratively shown by the perimeter line borders of each MMW field-of-view perimeter 202.

Figure 3D:
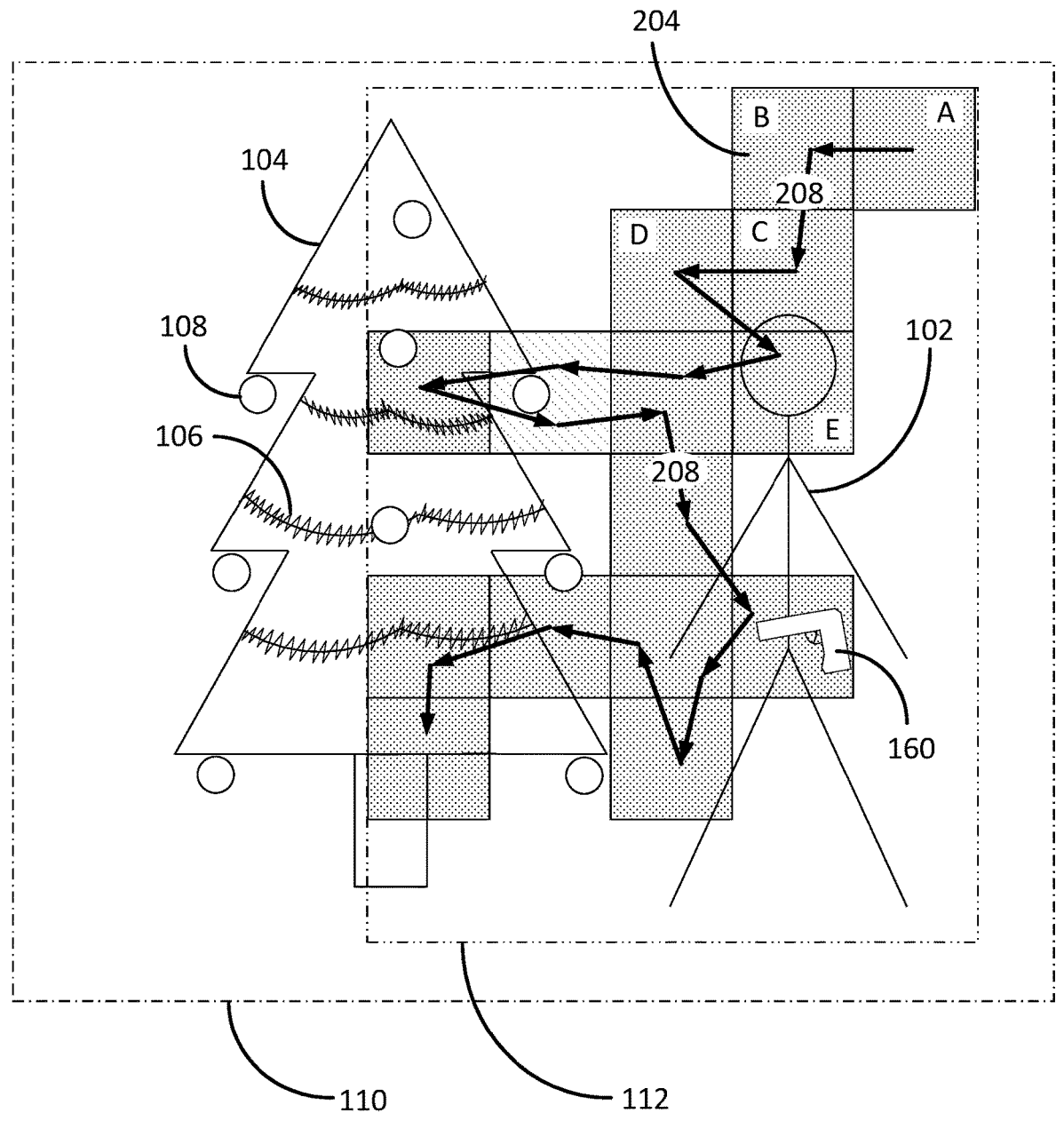

FIG. 3D illustratively depicts a semi-random/inconsistent path taken to ultimately accumulate an overall contiguous MMW image 105 that is captured by a handheld camera device 120 consistent with embodiments of the present invention. In this example, a human/end-user (not shown) holding a handheld version of the camera device 120 first takes a digital optical image of the scene 101, consistent with step 404, before collecting the MMW images 204. Certain embodiments envision the end-user looking at the optical image 115 displayed on the handheld camera devices display screen 130 while collecting the MMW images 204. Here, the end-user first collects MMW image A, then image B, then image C and so on, following the meandering path (non-deterministic scanning pattern) likely followed by how the end-user would scan to collect an overall MMW image 105. It should be appreciated, that the end-user will need to fill in the parts that are missing to ultimately construct the overall MMW image 105 based on the image collected and stitched together, which in essence is feedback of the missing parts displayed by the algorithm (essentially on-the-fly). For example, if an overall MMW image 105 requires 30 MMW images 204 that are stitched together in a contiguous assemblage and yet only 20 MMW images 204 are taken, the end-user will have to sweep the camera 100 over the missing MMW image regions until all 30 MMW images 204 are taken. Optional embodiments envision a growing MMW image 205 that is not made up of discrete MMW images 204, but rather just a growing region of MMW area that ultimately generates the overall MMW image 205.

Figure 3E:
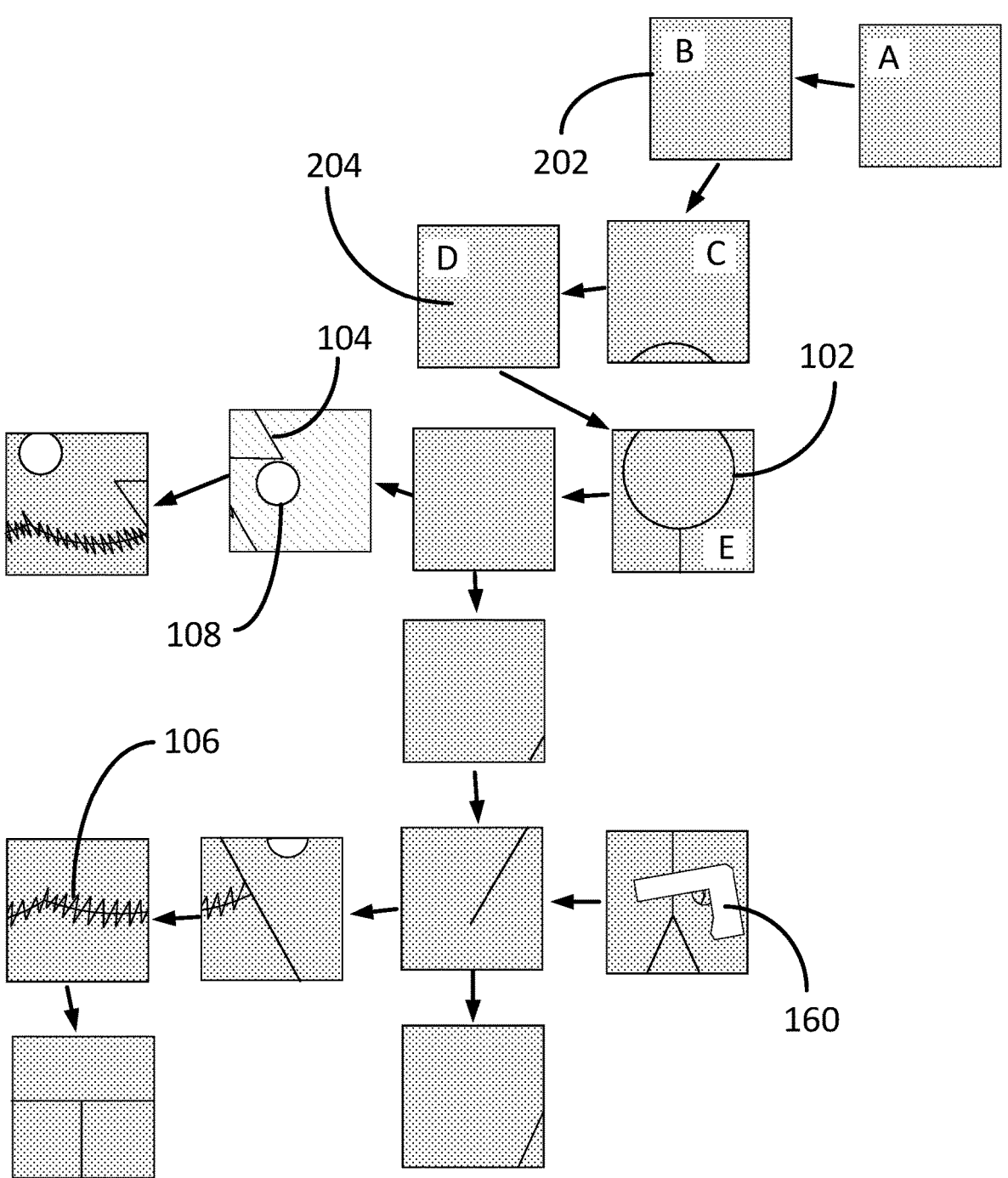

Meanwhile, as shown in FIG. 3E, the stitching and overlay software algorithm 254 stitches together the plurality of MMW images (image A, image B, image C, and so forth), step 416. As previously discussed, identification software programs can be installed in the memory device 252 and executed on this processor 250 that match or otherwise identify and visually display the kind of weapon found by the MMW camera 125. Alignment of the MMW images 204 with respect to the optical image 115 can be accomplished through edge detect in the stitching and overlay software algorithm 254 or optionally via one of many positioning techniques that keep track of the MMW line of sight position relative to the optical image 115. Examples include an accelerometer, laser feedback, GPS, multiple camera triangulation, etc. Positioning techniques essentially provide feedback to the system 100 thereby giving the end-user knowledge of where they are pointing at all times. Coupled with updating the superimposition of the MMW images 204 with the optical image 115, the end-user can continue to swing the camera 100 back and forth until any missing MMW image 104 is filled. That is, any 'hole' in the overall MMW image 105 is filled in by the end-user through the continued sweeping across the scene 101 based on feedback of missing portions in the overlay. With that said, optional positioning feedback techniques to reference against the MMW images 204 in space can include, but are not limited to a GPS keeping track of the movement of the MMW camera 125, an accelerometer to detect the movement of the MMW camera relative to the time the optical image was formed, a stepper motor index grid counter and level system, a laser or optical positioning tracker, for example.

In certain configurations, the MMW images 204 may be "fuzzy" (i.e., low contrast and/or resolution) due to the inherently long wavelength. This may require performing a statistical mathematical best fit of the MMW images 104 over elements identified in the optical image 115. This may not be necessary with the use of a 3-D accelerometer, or other positioning technique, because the overlay position of any MMW image 104 with the optical image 115 is already known. Of course, it may be beneficial to use both a known position technique and a mathematical best fit technique in conjunction to overlay the two images 115 and 204, as an a redundant measure. Hence, non-deterministic picture taking methods of the MMW frequency and optical radiation range via the handheld camera 100 (which is the random motion of sweeping through a scene 101 by the end-user) is made possible by informing the end-user where they are while taking the overall MMW image 105.

In another embodiment, the visible light camera and the MMW camera are generally aligned. The optical camera continues to run while the MMW camera is panned in the meandering path. Each MMW image is correlated with the corresponding optical image at the same moment. Stitching algorithms overlay the MMW images using the optical image.

Figure 5A:
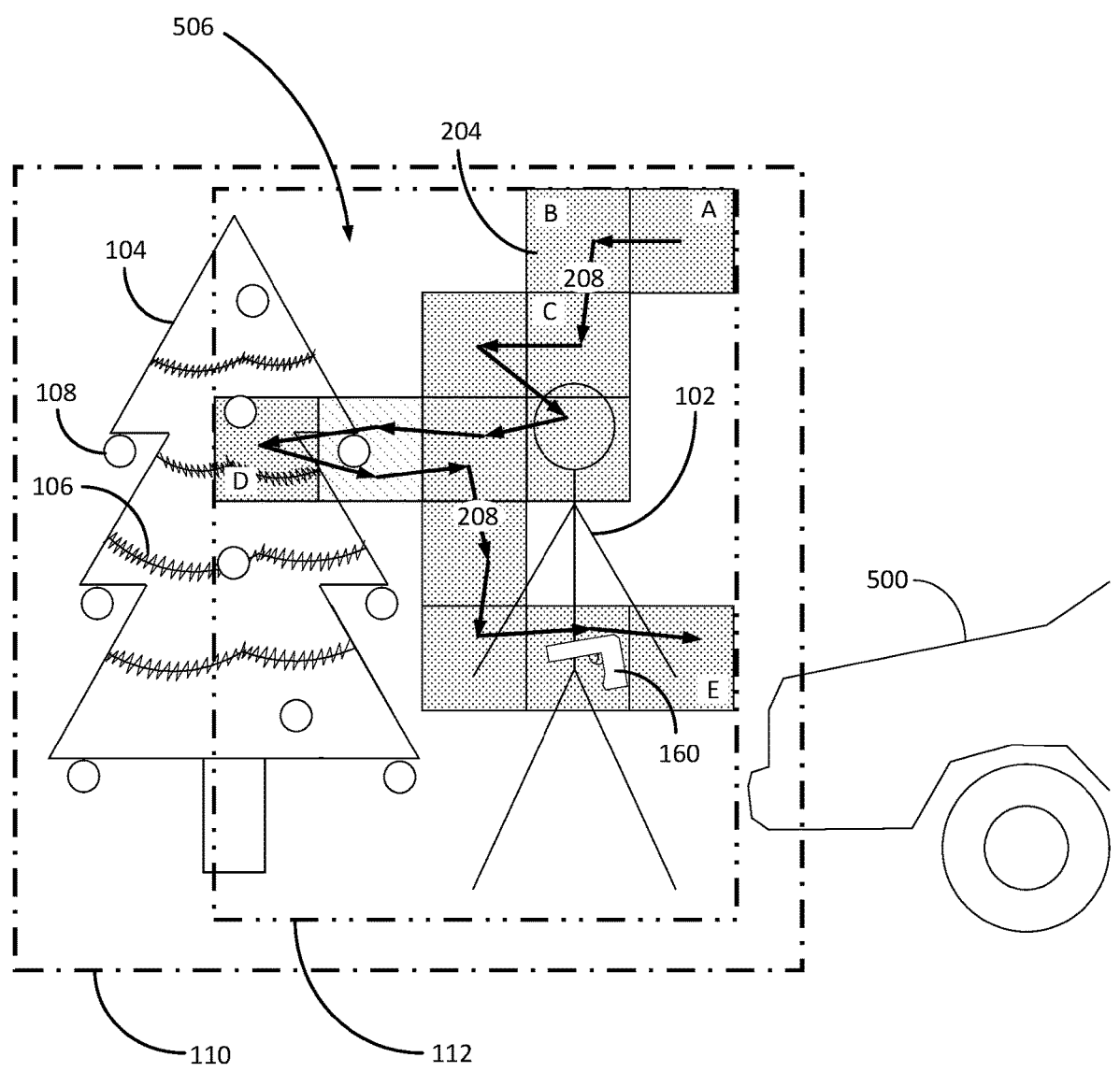
FIGS. 5A and 5B depict another embodiment of the present invention of an expanding optical perimeter consistent with embodiments of the present invention.
Figure 5B:
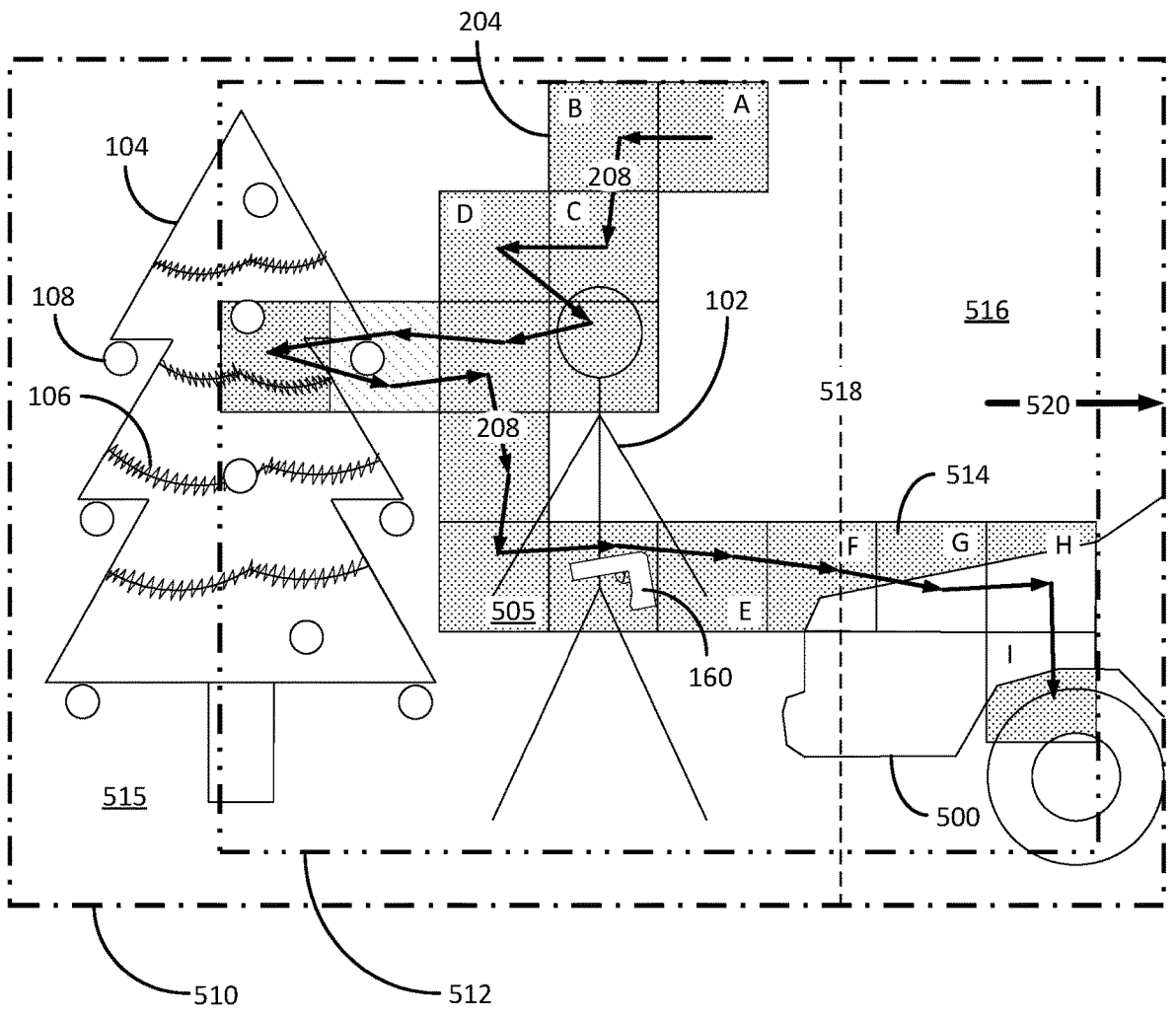

FIGS. 5A and 5B depict another embodiment of the present invention of an expanding optical perimeter consistent with embodiments of the present invention. FIG. 5A illustratively shows the scene 506 that includes the person 102, the Christmas tree 104 and an automobile 500, wherein the automobile 500 is not in the MMW perimeter 112 but is just inside of the optical perimeter 110 (which is the original optical field-of-view). Certain embodiments of the present invention envision the optical camera 122 continuously running and able to expand in size to accommodate an expanding MMW perimeter 512. For example, an end-user takes a plurality of MMW images 204 that ends with MMW image E inside of the original optical perimeter 110, as shown in FIG. 5A. However, the end user continues to take MMW images 514 (images F, G, H and I) that are external to the original optical perimeter (shown by the demarcation line 518) to the right 520 of the original optical perimeter 110, FIG. 5B. In response to these new external optical perimeter MMW images 514, the optical camera 122 that points with the MMW camera 125 thus growing the size of the optical perimeter because the optical and MMW cameras 122 and 125 share a common line of sight 150. Accordingly, MMW images 204 now include the automobile 500 and are overlaid over the expanded optical image 516 of the automobile 500. Certain embodiments envision the optical image also stitched together much like the MMW images 204 and 514. Note that the metallic portions of the automobile 500 are enhanced in the MMW images 204. Certain embodiments envision the aspect ratio of the displayed optical image 515 and the overall displayed MMW image 505 adjust to fit on the display 130, such as like a panoramic view. One advantage to this embodiment is that an end-user can see the MMW image and grow it as needed.

With the present description in mind, below are some examples of certain embodiments illustratively complementing some of the methods and apparatus embodiments to aid the reader. The elements called out below are examples provided to assist in the understanding of the present invention and should not be considered limiting.

In that light, certain embodiment contemplate a detector 120 comprising: a digital optical camera 122 having a line of sight 150 and an optical camera field-of-view 110; a millimeter wavelength (MMW) camera 125 including at least one MMW antenna 124, at least one MMW collecting horn 126 and at least a one pixel MMW sensor 129, the MMW camera 125 essentially pointing in the line of sight 150, the MMW camera having an MMW camera field-of-view 202, the MMW camera field-of-view 202 is smaller than the optical camera field-of-view 110; a computer system 128 with a microprocessor 250 and non-transitory memory 252 operable with a display 130; an overlay MMW and optical image verification algorithm 254 that overlays a plurality of MMW images 204 obtained from the MMW camera 125 with an optical image 115 obtained from the digital optical camera 122, the verification algorithm 254 retained in the non-transitory memory 252 and executed by the microprocessor 250.

The detector 120 embodiment further comprising the digital display screen 130.

The detector 120 embodiment further comprising an optical light source 142 that emits light 140 in a light frequency between ultraviolet and infrared in the optical camera field-of-view 110 and/or an MMW radiation source 148 that emits radiation 141 between 3-300 GHz in the MMW camera field-of-view 202.

The detector 120 embodiment further comprising a housing 121 that essentially houses the digital optical camera 122 and the MMW camera 125.

The detector 120 embodiment further considering wherein the optical image 115 includes a living subject image 102b and an overall MMW image 105 that includes at least one metallic object image 160 that is superimposed over the living subject image 102b, the overall MMW image 105 is a compilation of the plurality of the MMW images 204.

The detector 120 embodiment further imagining the optical image 115 includes an image of a bag and an overall MMW image 105 that includes at least one metallic image 160 that is superimposed over the image of a bag, the overall MMW image 105 is a compilation of the plurality of the MMW images 204.

The detector 120 embodiment further wherein the detector 120 is handheld and further comprises a stitching algorithm 254 retained in the non-transitory memory 252 and an overall MMW image 105 displayed on the display 130, the overall MMW image 105 is essentially a contiguous compilation of a plurality of the MMW images 204 captured along an inconsistent path 208 that are stitched together via the stitching algorithm 254.

Other embodiments envision a method for capturing a detector image 105 and optical image 115, the method comprising: providing a detector device 120 that includes a digital optical camera 122 having an optical field-of-view 110 defining an optical image perimeter, a millimeter wavelength (MMW) camera 125 having an MMW field-of-view 202, a microprocessor 250 and non-transitory memory 252; capturing a digital optical image 115 of a subject 102 with the digital optical camera 122; storing the digital optical image 115 in the non-transitory memory 252; taking a plurality of MMW images 204 of a plurality of different portions of the subject 102; and overlaying the plurality of MMW images 204 over the digital optical image 115 within the optical image perimeter until at least a portion of interest 112b of the digital optical image 115 is essentially completely overlaid (as in FIG. 2B) with a contiguous assembly of the MMW images 204.

The method embodiment further comprising stitching together the plurality of MMW images 204 into the contiguous assembly that is a single overall MMW image 105.

The method embodiment further pondering wherein the stitching together step is accomplished via an overlay MMW and optical image verification algorithm 254 that is retained in the non-transitory memory 252 and executed by the microprocessor 250. This is further envisioned wherein the contiguous assembly is a single overall MMW image 105 that is equal to or smaller than the digital optical image 115.

The method of embodiment further comprising an end-user holding the detector device 120 in their hand, viewing the plurality of MMW images 204 on a display screen 130 overlaid on the digital optical image 115 while taking each of the plurality of MMW images 204, the display screen 130 is integrated with the detector device 120.

The method of embodiment further envisioning wherein the MMW camera 125 includes at least one MMW antenna 124, at least one MMW collecting horn 126 and at least a one pixel MMW sensor 129.

The method embodiment further comprising taking an external optical perimeter MMW image 514 that is outside of the digital optical image field-of-view 110, taking a second optical image that is at least partially outside of the digital optical image field-of-view 110.

The method of embodiment further comprising identifying a metallic object 160 in the plurality of MMW images 204. This method embodiment can further comprise alerting an end user of the identified metal object 160.

The method embodiment further considering wherein the MMW camera 125 and the optical camera 125 essentially pointing in a common line of sight 150, the MMW camera having an MMW camera field-of-view 202, the MMW camera field-of-view 202 is smaller than the optical camera field-of-view 110.

Yet another embodiment contemplates a combination camera detector device 120 comprising: a digital optical camera 122 possessing an optical camera field-of-view 110; a millimeter wavelength (MMW) camera 125 possessing an MMW camera field-of-view 202 that is less than or equal to the optical camera field-of-view 110, the MMW camera 125 pointing in a direction that is within the optical camera field-of-view 110; a computer system 128 with a microprocessor 250 and non-transitory memory 252 operable with a display 130; and an overlay MMW and optical image verification algorithm 254 configured to overlay a plurality of MMW images 204 obtained from the MMW camera 125 with an optical image 115 obtained from the digital optical camera 122, the verification algorithm 254 retained in the non-transitory memory 252 and executed by the microprocessor 250.

The combination camera detector device 120 embodiment further comprising an overlaid displayed image 275 of a) an overall MMW image 105 consisting of a contiguous arrangement of the plurality of MMW images 204 that is superimposed on the optical image 115.

The combination camera detector device 120 further comprising a means for moving the MMW camera 125 within the optical camera field-of-view 110 to obtain the plurality of MMW images 204.

The above sample embodiments should not be considered limiting to the scope of the invention whatsoever because many more embodiments and variations of embodiments are easily conceived within the teachings, scope and spirit of the instant specification.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, though an integrated light source 148 and 149 are depicted with the camera system 120, they could just as easily be external as can be the display 130 without departing from the scope and spirit of the present invention. The stitching algorithm can be an evolving AI program to better overlay and accommodate the end-user while maintaining the core functionality, for example. Another example is the antenna 124, horn 125 and MMW detector 129 could include more or less elements to accommodate advancements in the art while still maintaining substantially the same functionality without departing from the scope and spirit of the present invention. Further, the term "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A detector comprising:
   a digital optical camera having a line of sight and an optical camera field-of-view;
   a millimeter wavelength (MMW) camera including at least one MMW antenna, at least one MMW collecting horn and only one MMW sensor that is a single pixel MMW sensor, the MMW camera essentially pointing in the line of sight, the MMW camera having an MMW camera field-of-view, the MMW camera field-of-view is smaller than the optical camera field-of-view;
   a computer system with a microprocessor and non-transitory memory operable with a display;
   an overlay MMW and optical image verification algorithm that overlays a plurality of successively captured MMW images obtained from the MMW camera with an optical image obtained from the digital optical camera, the verification algorithm retained in the non-transitory memory and executed by the microprocessor.

2. The detector of claim 1, wherein the MMW camera is a passive MMW camera.

3. The detector of claim 1 further comprising an optical light source that emits light in a light frequency between ultraviolet and infrared in the optical camera field-of-view that is detected by the optical camera and/or an MMW radiation source that emits radiation between 3-300 GHz in the MMW camera field-of-view.

4. The detector of claim 1 further comprising a housing that essentially houses the digital optical camera and the MMW camera.

5. The detector of claim 1 wherein the optical image includes a living subject image and an overall MMW image that includes at least one metallic object image that is superimposed over the living subject image, the overall MMW image is a compilation of the plurality of the MMW images.

6. The detector of claim 1 wherein the optical image includes an image of a bag and an overall MMW image that includes at least one metallic image that is superimposed over the image of a bag, the overall MMW image is a compilation of the plurality of the MMW images.

7. The detector of claim 1 wherein the detector is hand-held and further comprises a stitching algorithm retained in the non-transitory memory and an overall MMW image displayed on the display, the overall MMW image is essentially a contiguous compilation of a plurality of the MMW images, wherein said plurality of the MMW images are comprised of different pieces of a target captured along an inconsistent path that are stitched together via the stitching algorithm.

8. A method for capturing a detector image and optical image, the method comprising:

providing a detector device that includes a digital optical camera having an optical field-of-view defining an optical image perimeter, a millimeter wavelength (MMW) camera having an MMW field-of-view, a microprocessor and non-transitory memory;

capturing a digital optical image of a subject with the digital optical camera;

storing the digital optical image in the non-transitory memory;

taking a plurality of MMW images of a plurality of different portions of the subject; and overlaying the plurality of MMW images over the digital optical image within the optical image perimeter until at least a portion of interest of the digital optical image is essentially completely overlaid with a contiguous assembly of the MMW images.

9. The method of claim 8 further comprising stitching together the plurality of MMW images into the contiguous assembly that is a single overall MMW image of at least part of the subject.

10. The method of claim 9 wherein the stitching together step is accomplished via an overlay MMW and optical image verification algorithm that is retained in the non-transitory memory and executed by the microprocessor.

11. The method of claim 9 wherein the contiguous assembly is a single overall MMW image that is equal to or smaller than the digital optical image.

12. The method of claim 8 further comprising an end-user holding the detector device in their hand, viewing the plurality of MMW images on a display screen overlaid on the digital optical image while taking each of the plurality of MMW images, the display screen is integrated with the detector device.

13. The method of claim 8, wherein the MMW camera is a passive MMW camera that includes at least one MMW antenna, at least one MMW collecting horn and only one MMW sensor that is a one-pixel MMW sensor.

14. The method of claim 8 further comprising taking an external optical perimeter MMW image that is outside of the digital optical image field-of-view, taking a second optical image that is at least partially outside of the digital optical image field-of-view.

15. The method of claim 8 further comprising identifying a metallic object in the plurality of MMW images.

16. The method of claim 15 further comprising alerting an end user of the identified metal object.

17. The method of claim 8 wherein the MMW camera and the optical camera essentially pointing in a common line of sight, the MMW camera having an MMW camera field-of-view, the MMW camera field-of-view is smaller than the optical camera field-of-view.

18. A combination camera detector device comprising:

a digital optical camera possessing an optical camera field-of-view, the digital optical camera configured to capture an optical image of a person;

a millimeter wavelength (MMW) camera possessing an MMW camera field-of-view that is less than or equal to the optical camera field-of-view, the MMW camera configured to capture a plurality of MMW images wherein each of the MMW images is of a different portion of the person, the MMW camera pointing in a direction that is within the optical camera field-of-view;

a microprocessor and non-transitory memory operable with a display; and an overlay algorithm configured to overlay the plurality of MMW images over the optical image in a combined image, the combined image is an overlay of each of the plurality of MMW images matched to the optical image, the overlay algorithm retained in the non-transitory memory and executed by the microprocessor.

19. The combination camera detector device of claim 18 further comprising an overlaid displayed image of an overall MMW image consisting of a contiguous arrangement of the plurality of MMW images that is superimposed on the optical image.

20. The combination camera detector device of claim 18 further comprising means for moving the MMW camera within the optical camera field-of-view to obtain the plurality of MMW images.

\* \* \* \* \*